Aug. 7, 1945.　　　H. A. SLAD　　　2,381,084
TWEEZERS
Filed July 15, 1943　　　2 Sheets-Sheet 1
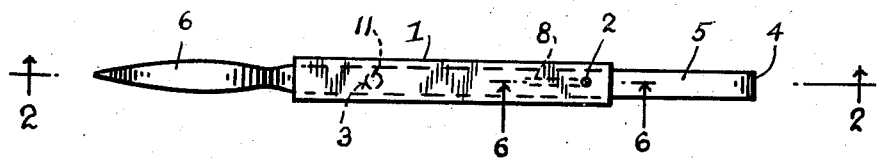
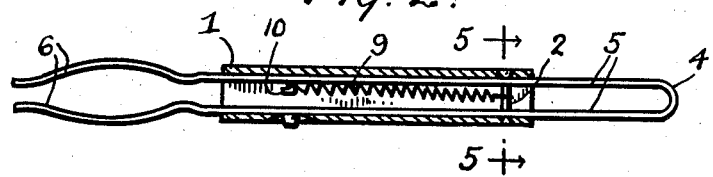
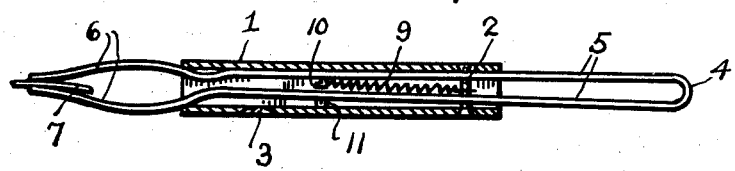
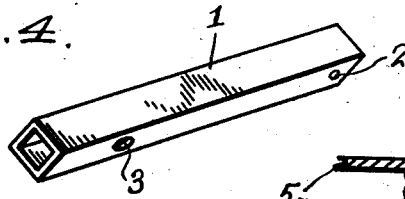
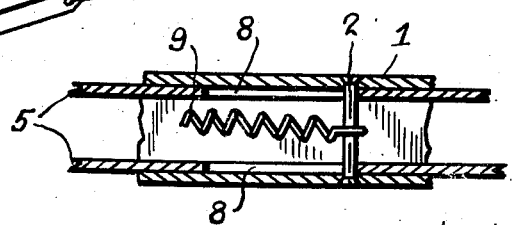
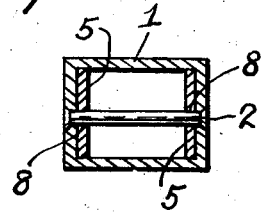
Inventor
Harry A. Slad
By Clarence A. O'Brien
and Harvey B. Jacobson
Attorneys

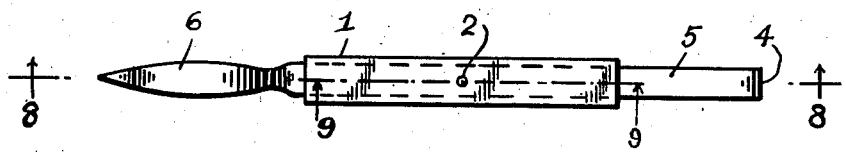
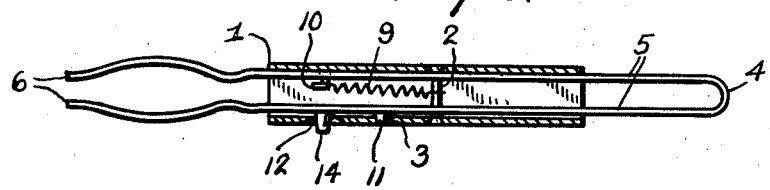
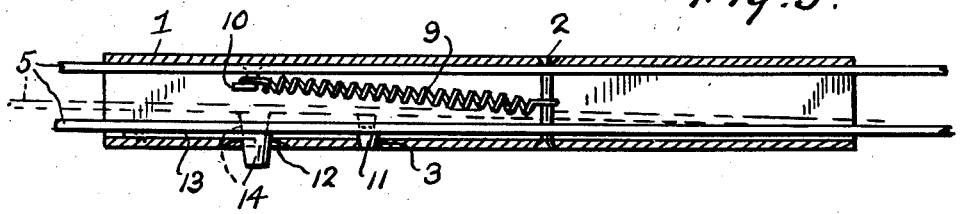
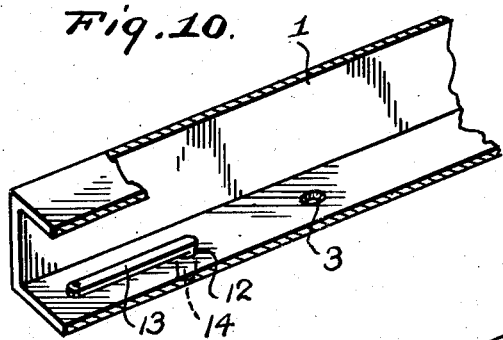
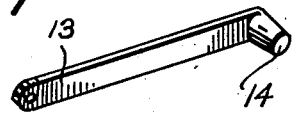
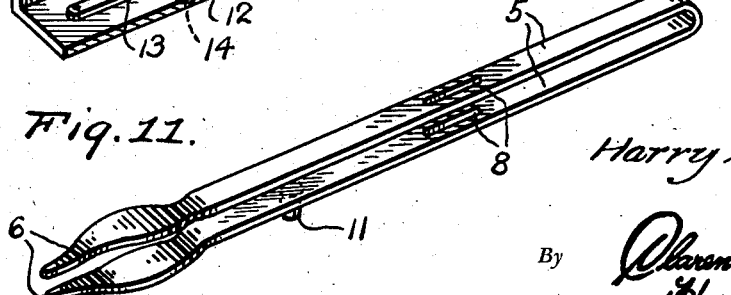

Patented Aug. 7, 1945

2,381,084

UNITED STATES PATENT OFFICE 2,381,084

TWEEZERS

Harry A. Slad, West Chester, Ill., assignor of fifty per cent to Lillian Catherine Slad, West Chester, Ill.

Application July 15, 1943, Serial No. 494,869

3 Claims. (Cl. 128—354)

The present invention relates to new and useful improvements in tweezers and has for its primary object to provide, in a manner as hereinafter set forth, an instrument of this character comprising novel means for gripping and quickly extracting the hair, thereby substantially eliminating pain.

Other objects of the invention are to provide an instrument of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein—

Figure 1 is a view in side elevation of a pair of tweezers constructed in accordance with the present invention.

Figure 2 is a view in horizontal section through the instrument, taken substantially on the line 2—2 of Figure 1.

Figure 3 is a view in horizontal section through the instrument, showing the jaws closed with an extracted hair therein.

Figure 4 is a detail view in perspective of the tube.

Figure 5 is a cross sectional view, taken substantially on the line 5—5 of Figure 2.

Figure 6 is a fragmentary view in horizontal section, taken substantially on the line 6—6 of Figure 1.

Figure 7 is a view in side elevation of a slightly modified form of the invention.

Figure 8 is a view in horizontal section through the modification, taken substantially on the line 8—8 of Figure 7.

Figure 9 is a view in horizontal section on an enlarged scale, taken substantially on the line 9—9 of Figure 7.

Figure 10 is a fragmentary view in perspective of a portion of the tube of the modification.

Figure 11 is a perspective view of the slidable gripper.

Figure 12 is a detail view in perspective of the releasing member of the modification.

Referring now to the drawings in detail, it will be seen that reference numeral 1 designates a tube of substantially rectangular cross section, said tube being of any suitable material and dimensions. Mounted in one end portion of the tube 1 is a pin 2. The forward end portion of the tube 1 has formed therein an opening 3.

A substantially U-shaped, resilient gripper 4 is mounted for longitudinal sliding movement in the tube 1 and projects beyond the ends thereof. The legs 5 of the gripper 4 terminate in oppositely bowed jaws 6 which are adapted to receive therebetween and firmly grip the hair to be extracted, as at 7.

The legs 5 of the gripper 4 have formed therein longitudinal slots 8 which accommodate the pin 2. Thus, the pin 2 constitutes means for positively limiting the sliding movement of the gripper 4 in opposite directions in the tube 1. A coil spring 9 has one end connected to the pin 2 and the other end connected, as at 10, to the forward portion of one of the legs 5 for retracting the gripper 4 in the tube 1. Projecting from the other leg 5 is a lug or the like 11 which is engageable in the opening 3 for releasably securing the gripper 4 in its forward or projected position in the tube 1 against tension of the coil spring 9.

It is thought that the operation of the device will be readily apparent from a consideration of the foregoing. Briefly, the tendency of the legs 5 of the resilient gripper 4 is to spread or open. The gripper 4 is pushed forwardly in the tube 1 against the tension of the coil spring 9 until the lug 11 reaches the opening 3 and engages therein. Thus, the gripper 4 is releasably secured in projected position in the tube 1 with the jaws 6 open. The jaws 6 are positioned on opposite sides of the hair 7 to be extracted and the lug 11 is pushed inwardly by suitable means, such as a nail small enough to enter opening 3. Thus, the jaws 6 are caused to grip the hair 7 therebetween. Inward pressure is continued on the lug 11 until said lug has been forced into the tube 1 and clears the opening 3. When this occurs the coil spring 9 instantly jerks the gripper 4 rearwardly in the tube 1 for painlessly extracting the hair.

In the modification illustrated in Figures 7 to 12, inclusive, of the drawings, the tube 1 is provided with an additional opening 12 forwardly of the opening 3. Then, a flat spring 13 is mounted longitudinally in the forward end portion of the tube 1 with its forward end secured thereto. An operating lug 14 is fixed on the other end portion of the spring 13 and projects through the opening 12 for manual actuation.

In the operation of the modification, the lug 14 is pressed inwardly with the thumb of the hand which holds the instrument. It will be observed that one of the legs 5 of the gripper 4 is engaged longitudinally with the spring 13. When the lug 14 is pressed inwardly this leg 5 is flexed sufficiently to withdraw the locking lug 11 from its respective opening 3, thus releasing the gripper 4 for permitting its actuation by the coil spring 9. In other respects this embodiment of the device is substantially similar in construction and operation to that illustrated in Figures 1 to 6, inclusive, of the drawings.

It is believed that the many advantages of an instrument constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. A pair of tweezers comprising a tube open at its ends, a substantially U-shaped, resilient gripper slidably mounted in and projecting beyond opposite ends of the tube, the legs of said gripper having longitudinal slots therein, coacting jaws on one end of the gripper adapted to receive and grip a hair therebetween, a cross pin mounted in the tube and engaged in the slots for limiting the sliding movement of the gripper, and a coil spring in the tube having one end connected to the pin and its other end connected to one leg of the gripper for actuating said gripper for extracting the hair.

2. A pair of tweezers comprising a tube of substantially rectangular cross section open at its ends, said tube having a transverse opening in one side of its forward end portion, a substantially U-shaped, resilient gripper slidably mounted in and projecting beyond opposite ends of the tube, the legs of said gripper having longitudinal slots therein, coacting jaws on one end of said legs adapted to receive and grip a hair therebetween, a cross pin in the tube engaged in the slots for limiting sliding movement of the gripper in opposite directions, a coil spring in the tube having one end connected to the pin and its other end connected to one of the legs of the gripper for actuating said gripper for extracting the hair, and a lug on the other leg of the gripper engageable in the opening for releasably securing said gripper in projected position in the tube against the tension of the coil spring.

3. A pair of tweezers comprising a tube open at its ends, a resilient gripper slidably mounted in the tube, said gripper being substantially U-shaped and including a pair of legs, said legs having longitudinal slots therein, the tube having spaced openings in its forward portion, coacting jaws on the free ends of the gripper legs adapted to receive therebetween and grip a hair, a pin in the tube engaged in the slots for limiting the sliding movement of the gripper, a coil spring in the tube having one end connected to the pin and its other end connected to the gripper for actuating said gripper for extracting the hair, a lug on the gripper engageable in one of the openings for securing the gripper in projected position against the tension of the coil spring, a flat spring mounted longitudinally in the forward portion of the tube and having one end secured thereto, said flat spring being engaged with one of the legs of the gripper, and a manually operable member on the other end portion of the flat spring projecting through the other opening, said flat spring and the member thereon constituting means for flexing the gripper for withdrawing the lug from said one opening.

HARRY A. SLAD.